March 7, 1961 W. G. WHITNEY 2,973,965
TRANSVERSAL-PHONOGRAPHIC MACHINES
Filed Sept. 26, 1957 2 Sheets-Sheet 1
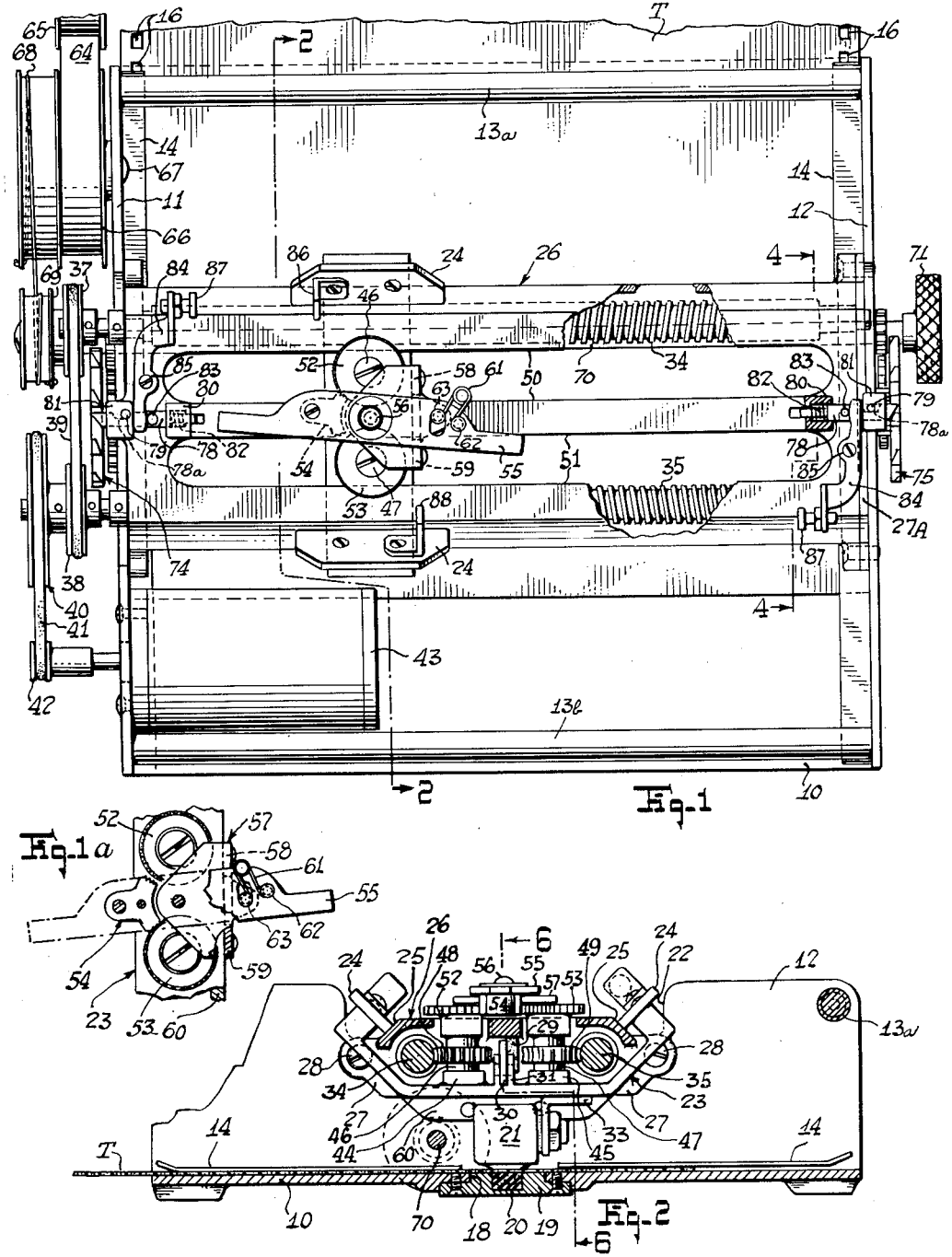
INVENTOR
William G. Whitney
BY George H. Fritzinger
Agt.

March 7, 1961 W. G. WHITNEY 2,973,965
TRANSVERSAL-PHONOGRAPHIC MACHINES
Filed Sept. 26, 1957 2 Sheets-Sheet 2
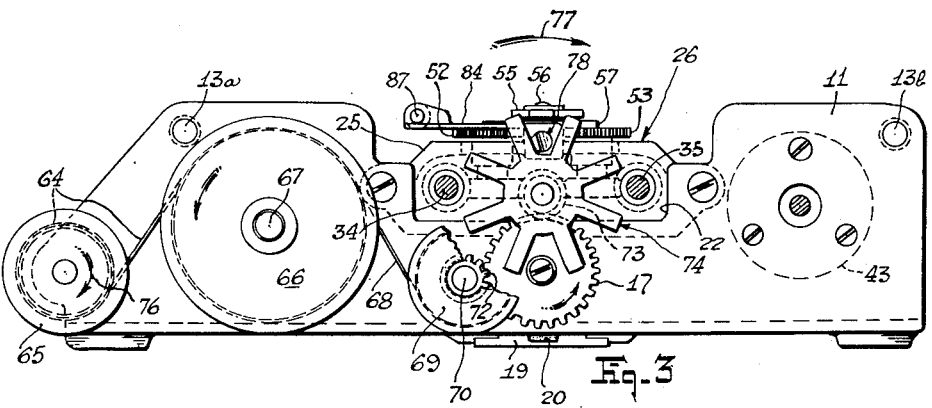
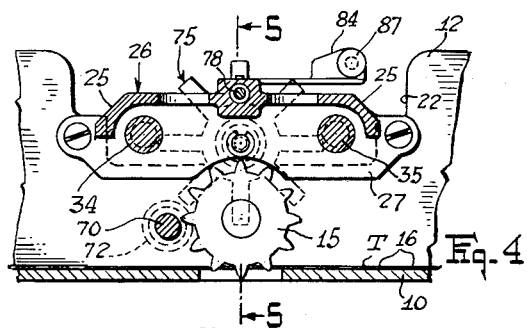
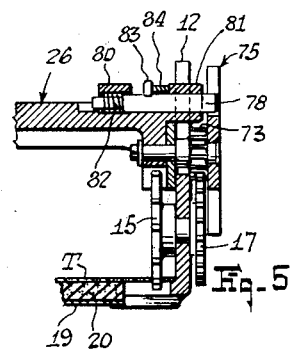
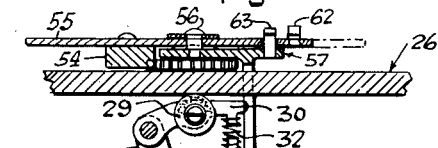
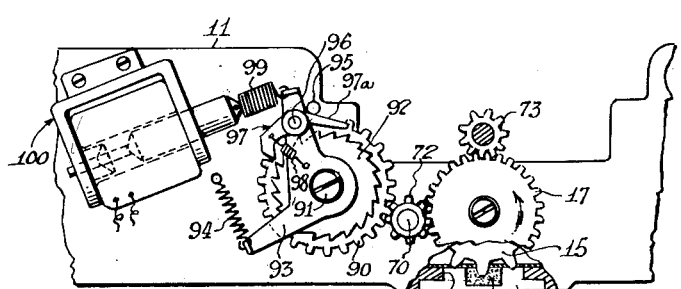
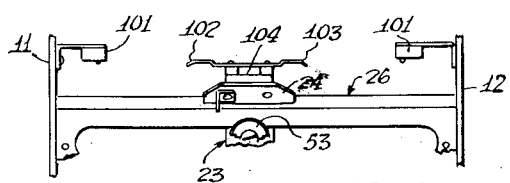
INVENTOR
William G. Whitney
BY

United States Patent Office 2,973,965
Patented Mar. 7, 1961

2,973,965

TRANSVERSAL-PHONOGRAPHIC MACHINES

William G. Whitney, Pines Lake, Wayne Township, Passaic County, N.J., assignor to McGraw-Edison Company, Elgin, Ill., a corporation of Delaware Filed Sept. 26, 1957, Ser. No. 686,491

4 Claims. (Cl. 274—4)

This invention relates to improvements in phonographic machines of the type which move the translating head in directions generally transverse to the direction of advance of the record medium. More particularly, the invention relates to such machines in which the record medium is stepped ahead by successive intervals in synchronism with the reversing of the carriage for the translating head.

In transversal-phonographic machines in which the record medium is advanced by successive intervals, there is a problem in coordinating the record driving mechanism and the carriage-drive reversing means so that the record is advanced at the instant the carriage is reversed. For instance, if the intermittent advance of the record and the reversing of the carriage are triggered independently by movement of the carriage into its end positions an adjustment is required in the mechanism to time the two operations to occur simultaneously. Such adjustment is not only difficult to make but also difficult to maintain during use of the machine.

My invention comprehends the use of a power means separate from the driving force applied to the carriage for both reversing the carriage drive and intermittently advancing the record. This power means is so arranged that it inherently will reverse the carriage driving means and step the record ahead by a given interval at the same time without need for any adjustable components to achieve or maintain the necessary synchronous operation. The carriage is then relied on only to trigger this power means to perform its dual functions when the carriage reaches predetermined end points in its travel. The rate or speed of over-center tripping is therefore independent of the rate of carriage movement. When records made from one machine are played by another, whatever adjustment, if any, which may be required to scan the successive tracks fully to the end and not there beyond can be attended to merely by setting the points in the drive of the carriage at which it will trigger the power means.

Objects of my invention are to provide in a transversal-phonographic machine an improved mechanism powered by means separate from the drive of the carriage for reversing the carriage at each end of its travel. More particularly, it is an object to provide such improved reversing mechanism which lends itself inherently to a synchronizing of an intermittent advance of the record medium with the reversing of the carriage, without the need for providing mechanical adjustability of its components.

These and other objects and features of my invention will be apparent from the following description and the appendant claims.

In the description of my invention reference is had to the accompanying drawings, of which:

Figure 1 is a plan view with parts broken away of a phonographic machine incorporating my invention;

Figure 1a is a fractional plan view showing the carriage reversing means shifted from the position it occupies in Figure 1;

Figure 2 is a vertical sectional view taken substantially on the line 2—2 of Figure 1;

Figure 3 is a lefthand view of the machine of Figure 1;

Figure 4 is a fractional vertical section taken substantially on the line 4—4 of Figure 1;

Figure 5 is a fractional vertical sectional view taken substantially on the line 5—5 of Figure 4;

Figure 6 is a fractional sectional view taken substantially on the line 6—6 of Figure 2;

Figure 7 is a fractional lefthand side elevational view of the machine illustrating a different form of motive means for reversing the carriage and advancing the record; and Figure 8 is a fractional plan view illustrating a control means for the motive means of Figure 7.

Transversal-type phonographic machines are especially adapted for use on magnetic record media, and my invention is herein accordingly described in terms of such machine by way of preferred example. With reference to the figures, the machine may have a frame comprising a base 10 with upright side walls or standards 11 and 12. These standards may be interconnected at the front and back of the machine by respective rigidifying rods 13a and 13b. The base may have a flat upper surface forming a channel with the side standards through which a magnetic web or wide tape T is fed, such tape comprising typically a non-magnetic base as of paper or plastic coated on its upper side with magnetic particles as of iron oxide. The magnetic tape is guided flat across the base 10 by side guide members 14 overlying the side borders of the tape, and is propelled by two sprocket wheels 15 which mesh with sprocket holes 16 in the border portions of the tape. These sprocket wheels have shafts journaled in the side standards midway the length of the frame (Figures 4 and 5), and secured to the outer ends of the shafts are gears 17 for driving the sprocket wheels to advance the magnetic tape as herein later more fully described. The base has a narrow opening 18 extending transversely thereof in line with the sprocket wheels into which the teeth of the wheels project to engage the tape. However, this opening is filled throughout its length between the sprocket wheels by an insert 19 having a slot lengthwise thereof filled by a pad 20 as of soft rubber. This pad provides a yieldable backing for the magnetic tape where it is engaged by a magnetic recording and reproducing head 21.

The standards 11 and 12 have central cutaways 22 from the top to provide clearance for parts of the carriage drive mechanism for the head 21. The head carriage, referred to as 23, may be of the form of a yoke having upperly inclined end portions provided with shoes 24 inset therefrom and inwardly inclined. These shoes rest slidably on oblique tracks 25 at opposite sides of a horizontal transversely-extending bed plate 26 which may be a casting having depending mounting flanges 27 at its ends secured by screws 28 to the side standards. Thus, as shown in Figure 2, the carriage is suspended slidably from the bed plate across the underside thereof. In order to maintain the shoes 24 firmly in engagement with the tracks 25, a pressure roller 29 is journaled to one end of a rocker arm 30 the other end of which is pivoted to a forked lug 31 upstanding from the central part of the carriage (Figure 6) which arm is urged upwardly by a compression spring 32 to cause the pressure roller to bear against the underside of the bed plate and press the carriage downwardly thereon. The head 21 is secured rigidly to the underside of the carriage by a bracket 33.

The carriage is driven back and forth transversely of the record by two parallel feed screws 34 and 35 which are positioned below the tracks 25 between the bed plate and the carriage. These screws are journaled at their left ends in the left end flange 27, and pass through respective clearance openings in the right end flange 27 and are journaled at their right ends in an end plate 27a held in place by the screws 28, this plate being removable for assembling purposes. The left end portion of the feed screws extend beyond their bearings, and mounted thereon are respective pulleys 37 and 38 which are intercoupled by a belt 39. Concentric with the pulley 38 is a relatively large pulley 40 coupled by a belt 41 to the drive pulley 42 of a motor 43 mounted on the inner side of the left standard 11. The feed screws are driven preferably in the same direction, as shown, but respectively have left- and right-hand threads so that one will be effective to drive the carriage in a direction opposite to that of the other.

On the carriage between the feed screws are two upstanding bosses 44 and 45 carrying respective studs 46 and 47 on which are journaled respective worm wheels 48 and 49. These worm wheels are in continuous engagement with the respective feed screws 34 and 35. The worm wheels have upstanding hubs extending through respective clearance slots 50 and 51 in the bed plate, and mounted on these hubs above the bed plate are concentric ratchet wheels 52 and 53. These ratchet wheels are engageable alternately by a brake shoe 54 mounted on a trip lever 55 itself pivoted at its center 56 to a bracket 57 above the bed plate, the bracket itself being supported on the carriage by two depending legs 58 and 59 which extend respectively through the clearance slots 50 and 51 and are riveted at their lower ends to a flange 60 on the carriage. The trip lever 55 is a relatively long one extending generally in the direction of carriage movement both to the left and right of the carriage. This lever is biased over center by a compression type of torsion spring 61 interposed between studs 62 and 63 on the lever 55 and bracket 57 respectively, of which the latter extends through a suitable clearance opening in the lever. By making the ratchet wheels 52 and 53 large relative to the respective worm wheels and providing each with relatively fine teeth an almost instantaneous engagement is made between the brake shoe 54 and the respective wheels when the trip lever is shifted over center as from the position it occupies in Figure 1 to the position it occupies in Figure 1a. As a result, the carriage feed is shifted from one feed screw to the other in only the time required to throw the trip lever 55 over center. Moreover, this reversal is independent of whether or not the feed screws are in synchronism permitting therefore the feed screws to be intercoupled by a belt arrangement. However, the feature for obtaining instantaneous reversal of the carriage is not claimed herein since the same is being claimed in an application of James F. Freeman Serial No. 686,492, entitled Transversal-Phonographic Machines and filed on even date herewith.

My invention is concerned particularly with a means for reversing the carriage and for concurrently advancing the record by a given increment each time the carriage reaches a predetermined end point in its travel. In order that these two functions may be performed in synchronism at definite points of travel of the carriage without need for any mechanical adjustments in the mechanism, I employ a power means independent of the carriage drive for performing both functions. The power means is normally held in a detented state and is released momentarily by the carriage when the carriage reaches its predetermined end points of travel. In the embodiment of Figures 1 to 6, this power means is in the form of a coil spring 64 mounted in a circular housing 65 on the outer side of the left standard 11. Preferably, a spring of the so-called negator type is used which will exert a constant tension. This spring leads leads out from the housing 65 onto the inner race of a relatively large double-channeled drum 66 journaled at 67 to the outer side of the side standard 11. Wound onto the outer race of the drum 66 is a cord 68 which leads at its other end onto a relatively small drum 69. The drum 69 is mounted on the left end of a long transverse shaft 70 extending throughout the width of the machine and journaled at its end portions in the two side standards. Secured to the right end portion of this shaft is a knurled knob 71 by which the shaft can be turned by hand. This shaft is connected by gear trains at the sides of the machine to respective spiders 74 and 75 of which each gear train comprises a pinion gear 72 on the shaft, the aforementioned one of the gears 17 and a gear 73 connected to the respective spider. These spiders are vertically disposed on horizontal shafts journaled in end portions of the bed plate 26 about midway between the two feed screws 34 and 35. The torsion spring 64 exerts tension in the direction of the arrow 76 to urge the spiders constantly in a clockwise direction as indicated by the arrow 77 in Figure 3—which is in a direction tending to move the upper spokes of the spiders forwardly toward the front of the machine. However, there are respective detents 78 for the two spiders each in the form of a horizontal plunger mounted slidably in apertured bosses 80 and 81 in the respective end portions of the bed plate as shown in Figure 5. The detent plungers have reduced-diameter end portions passing through clearance holes in the inner end walls of the inner bosses 80 on which are mounted respective compression springs 82 to urge the plungers outwardly into their operate positions. The outer position of each plunger is defined by abutment of a cross-pin 83 in the plunger against one end of a horizontal trip lever 84 pivoted at 85 to the top side of the bed plate 26, the trip lever itself being located in its biased position by abutment against the respective boss 81. The outer end portion of each detent plunger extends between the two uppermost spokes of the respective spider and has an inclined cam fan at the end slating forwardly and inwardly relative to the machine as shown in Figure 1. Each plunger is restrained from turning about its axis by a pin 79 passing through the respective boss 81 and engaging a flat 78a in the plunger. The spiders are so angularly positioned on their shafts that the spokes of one are midway between those of the other. Although both detent plungers are normally in their outward operate positions, only one is active at any one time. As shown in Figure 1, the left detent 78 is the active one holding the left spider 74 from turning. Upon pressing this plunger inwardly, the spiders are stepped ahead under propulsion of the spring 64 until the right spider strikes against the rightward one of the detent plungers. This occurs when the spiders have advanced by one-half the angular distance between successive spokes.

When the carriage trip lever 55 is in its clockwise position shown in Figure 1, the rearward worm wheel is locked and the carriage is driven to the left. As the carriage nears the end of its leftward travel the left end of the trip lever 55 passes between the two uppermost spokes of the spider 74 and at the same time an abutment 86 on the rearward one of the carriage shoes 24 is moved against an adjustable screw 87 on the left one of the trip levers 84 to release the detent plunger 78 at the left side of the machine from the spider 74. The instant this release occurs the spider is shifted by one-half distance between successive spokes as aforementioned and by this movement it trips the lever 55 over center in a counter-clockwise direction to shift the brake from the rear worm wheel 48 to the front worm wheel 49 whereby to reverse the drive of the carriage. The carriage is then driven at uniform speed to the right by the feed screw 35. When the carriage nears the right end of its travel the rightward end of the trip lever 55 is moved between the spokes of the spider 75 and at the same time an abutment 88 on the front carriage shoe 24 is moved against an adjustable screw 87 on the right trip lever 84 to release the detent plunger 78 on the right side of the machine from the spider 75. The instant this release occurs the spiders are stepped ahead again by another increment equal to one-half the angular spacing between successive spokes to cause the right spider 75 to rock the trip lever 55 in a clockwise direction to reverse the drive of the carriage. This action keeps recurring to cause the carriage to be driven uniformly back and forth across the record by the respective feed screws, with the carriage being reversed well nigh instantaneously at each end of its travel. By adjusting the screw 87 on the levers 84 the end points at which the carriage is reversed are set.

Since the sprocket wheels 15 which engage the perforated tape T are connected to the intermediate gears 17 of the respective gear trains 72—73 which connect the shaft 70 to the spiders 74 and 75, the tape T is advanced an increment under the driving influence of the spring 64 at each instant one of the spiders is released to reverse the drive of the carriage. Thus, the head 21 on the carriage will scan successive transverse parallel tracks on the tape as the carriage is reciprocated back and forth across the record.

The tape T is loaded from the front of the machine by inserting its leading edge first in the slots between the base 10 and the side guide strips 14, pushing the tape rearwardly until it comes in engagement with the sprocket wheels 15, and then turning the sprocket wheels by means of the knob 71 until a predetermined length of the tape is fed into the machine. During such rotating of the sprocket wheels the spiders 74 and 75 are turned in counterclockwise directions (Figure 3) by camming of the spokes over the inclined end faces of the detent plunger 78. By this turning of the sprocket wheels during loading of the tape into the machine the spring 64 is wound up or charged. When the machine is driven by the motor 43 to record on or to reproduce from the tape, the spring 64 not only propels the spiders to reverse the carriage at each end of its travel but it also provides the motive power for propelling the tape T back out of the machine step by step in synchronism with the reversing of the carriage.

Instead of reversing the carriage drive and advancing the record tape by a power means which must be charged by the loading of the record tape into the machine, any suitable electrically driven power means may be employed to enable continuous operation of the machine on any desired length of tape. For example, as shown in Figures 7 and 8, the gear 72 on the shaft 70 may be in mesh also with a gear 90 journaled on a stud 91 on the side standard 11. Mounted on the gear 90 is a ratchet wheel 92, and pivoted on the outer end of the stud 90 is a lever 93 normally held by a light tension spring 94 in an inoperate position defined by abutment of the lever against a stop pin 95. Pivoted at 96 to an outer end portion of the lever 93 is a pawl 97 for engaging the ratchet wheel. This pawl is urged by a spring 98 towards the ratchet wheel but is normally held disengaged therefrom by an abutment of a rearward arm 97a of the pawl against the stop pin 95. Connected to the outer end portion of the lever 93 through a relatively stiff tension spring 99 is the armature of a solenoid 100 bracketed to the left standard 11. When the solenoid is energized its armature is drawn inwardly to exert a driving force in a counterclockwise direction on the lever 93. The spring 94 yields to this driving force transmitted through the relatively stiff spring 99, but in initial movement of the lever 93 the pawl 97 is released from the stop pin 95 and drawn into engagement with the ratchet wheel 92. The further movement of the armature following this engagement serves to charge the spring 99 and exert a driving force via the gears 72 and 17 which tends to advance the record tape T as well as to advance the spider 74 and 75, so long as the solenoid is kept energized. By the motive means so provided the spiders are stepped ahead to reverse the drive of the carriage and to advance the record concurrently by one increment each time the carriage reaches a selected end point in its travel.

This alternative embodiment as here shown and described requires that the solenoid 100 be energized each time the carriage reaches the end of its travel. For this purpose push button switches 101 are provided at the sides of the machine (Figure 8) which are operable respectively by cam fingers 102 and 103 secured at 104 to the carriage, the operation being such that as the carriage nears each end of its travel the respective cam finger will close the switch and cause the solenoid to be connected to a suitable source of power. An advantage of this arrangement is that the pawl 97 is held disengaged while the carriage is in the intermediate range of travel to allow the ratchet wheel then to be turned as by the knob 71 for purposes of loading a record in the machine.

Any suitable detent or friction means operative on the ratchet wheel 92 or any other part of the record driving means may be provided for preventing accidental displacement of the record while the carriage is in its intermediate range, should the normal friction on the record or record driving means be considered insufficient for this purpose.

In this second embodiment, the record is loaded leading edge first from the rear of the machine by inserting it into the slots between the base and side guards 14 and then turning the knob 71 until the sprocket wheels 15 have engaged the sprocket holes 16 in the leading portion of the record. Since the sprocket wheels must in this case be turned in a forward direction, the user must bridge his hand across the top of the machine and press inwardly on the pins 83 to hold the detent plungers 78 released from the spiders as he turns the knob 71. Having once started the record in engagement with the sprocket wheels he has conditioned the machine for operation on any length of tape without having to reload the machine. When long lengths of tape are to be used it may be provided in roll form at the back of the machine and be taken up in roll form at the front of the machine by any suitable means well known in the field and not herein necessary to show.

The embodiments of my invention herein particularly shown and described are intended to be illustrated and not limitative of my invention since the same is subject to changes and modifications without departure from the scope of my invention, which I endeavor to express according to the following claims.

I claim:

1. In a phonographic machine having a head for recording on a movable record: the combination of a carriage for said head mounted for movement transversely with respect to the movement of the record; two separate motive means; drive means operated by one of said motive means for moving the carriage across the record in either direction including means shiftable back and forth for recurrently reversing the drive means; means operated by said second motive means and controlled by said carriage when the same reaches predetermined end points in its travel for shifting said reversing means; and an intermittent drive means for said record operable by said second motive means and coordinated with the operation of said reversing means for advancing the record by a given increment at each instant said drive means is reversed.

2. In a phonographic machine having a head for recording on a movable record: the combination of a carriage for said head mounted for movement transversely with respect to the movement of the record; power operated drive means adapted for moving the carriage across the record in either direction including shiftable means on the carriage rockable back and forth for recurrently reversing the drive means; a rotatable spider at each end of the path of travel of the carriage, said shiftable means being moved into engagement with the spokes of said spiders respectively as the carriage is moved to predetermined end points of travel; power means for exerting a force tending to turn said spiders; a detent for each of said spiders released by the carriage as the same is moved to its respective end point for causing the spider to be stepped ahead to reverse said drive means as soon as said carriage reaches said end point; means for advancing said record; and means coupling said advancing means to said spider for causing said record to be advanced one step concurrently as said carriage drive means is reversed.

3. In a phonographic machine having a head for recording on a movable record: the combination of a carriage for said head mounted for movement transversely with respect to the movement of the record; power operated drive means adapted for moving the carriage across the record in either direction including shiftable means on the carriage rockable back and forth for recurrently reversing the drive means; a rotatable spider at each end of the path of travel of the carriage; means interconnecting said spiders for unison movement; power means for exerting a unidirectional driving force tending to turn said spiders; respective detents for said spiders alternately releasable by said carriage as it is moved to opposite ends of its travel to cause said spiders to be advanced by successive intervals each equal to one-half the angular distance between successive spokes thereof; said reversing means including an operating lever extending generally in the direction of travel of said carriage and pivotally connected at its center to said carriage, said lever having opposite end portions engageable with the spokes of said respective spiders as the carriage reaches its respective ends of travel, and said lever being actuated back and forth by said successive movements of said spiders for recurrently reversing said drive means.

4. In a phonographic machine having a head for recording on a movable record: the combination of a carriage for said head mounted for movement transversely with respect to the movement of the record; reversible drive means for moving said carriage back and forth across the record; and motive means controlled by said carriage and operable independently of said drive means for reversing said drive means and concurrently advancing said record by one increment at each instant the carriage reaches an end point of its travel.

References Cited in the file of this patent

UNITED STATES PATENTS

| | | |
|---|---|---|
| 138,437 | Richardson | Apr. 29, 1873 |
| 1,379,528 | Clark | May 24, 1921 |
| 2,124,673 | Puma | July 26, 1938 |
| 2,648,589 | Hickman | Aug. 11, 1953 |
| 2,798,725 | Marshall | July 9, 1957 |

FOREIGN PATENTS

| | | |
|---|---|---|
| 877,126 | France | Nov. 27, 1942 |
| 290,629 | Switzerland | Aug. 1, 1953 |
| 1,041,699 | France | Oct. 26, 1953 |